United States Patent

[11] 3,543,840

[72] Inventor William W. Chambers
Anaheim, California
[21] Appl. No. 772,969
[22] Filed Nov. 4, 1968
[45] Patented Dec. 1, 1970
[73] Assignee Robertshaw Control Company
Richmond, Virginia

[54] HEAT COUPLED CONTROL SYSTEM
10 Claims, 2 Drawing Figs.
[52] U.S. Cl. .................................................. 165/39,
165/122
[51] Int. Cl. ...................................................... B60h 1/00
[50] Field of Search ........................................... 165/40, 22,
39, 26, 122

[56] References Cited
UNITED STATES PATENTS
3,377,545  4/1968  Tueit............................  165/26

Primary Examiner—Charles Sukalo
Attorney—Fulwider, Patton, Rieber, Lee & Utecht

ABSTRACT: A control system including a sensing circuit having a sensing thermistor for sensing the environmental temperature and, at specified variances from a target temperature, triggering a rectifier which actuates a temperature change apparatus and initiates current flow through a heat motor. A blower fan is controlled by a circuit formed by a voltage divider circuit including a triggering thermistor disposed in heat exchange relationship with the heat motor. Heating of the triggering thermistor changes the voltage in said divider circuit and, after a selected time, triggers a controlled rectifier which actuates the fan to circulate air through the temperature change apparatus and bring the environment back within a specified temperature range.

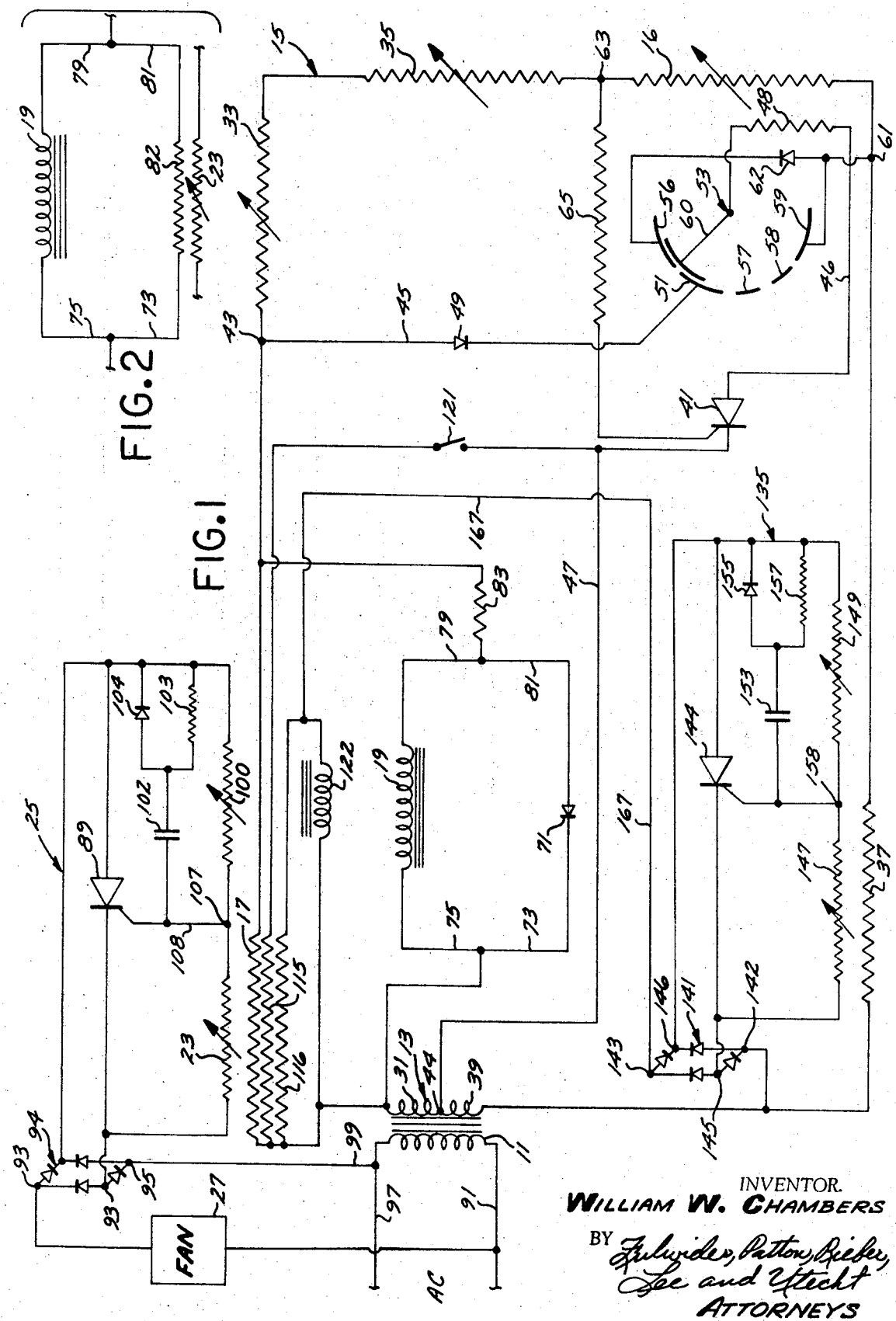

HEAT COUPLED CONTROL SYSTEM

BACKGROUND OF THE INVENTION

1. Field of the Invention

The present invention relates to temperature control systems of the type which are responsive to a difference between a selected temperature and the environmental temperature to operate a temperature change apparatus, such as a heater, cooler or fan, and to maintain such apparatus actuated until the selected environmental temperature is reached.

2. Description of the Prior Art

The usual temperature control systems include a sensing circuit which is responsive to variances in the environmental temperature to actuate a temperature change apparatus and energize a heat motor. The heat motor heats a thermostatic blade in a control circuit to, after a selected time, complete such control circuit and activate a fan for circulating air through the temperature change apparatus. Since the control circuits are frequently subjected to relatively high voltages, the electrical contacts associated with the thermostatic blade are subject to electrical arcing and frequently become welded together.

SUMMARY OF THE INVENTION

The present invention is characterized by a temperature sensing circuit which senses the environmental temperature and, when such temperature varies a predetermined amount from a selected temperature, actuates a temperature change apparatus and a heat motor. The heat motor heats a heat sensitive resistor in a control circuit and, after a selected time, renders the control circuit operative to actuate a fan for circulating air through the temperature change apparatus.

An object of the present invention is to provide a control system which provides for delayed actuation of an air circulating device to permit a temperature change apparatus to reach its operating temperature before air circulation is commenced.

Another object of the present invention is to provide a control system of the type described which includes a low voltage sensing circuit that is electrically isolated from a high voltage control circuit.

A further object of the present invention is to provide a control system of the type described which eliminates the use of movable contacts.

The foregoing, as well as other objects and features of the present invention, may be more clearly understood by reference to the following detailed description when considered with the drawing which illustrates particular temperature control systems according to the present invention.

BRIEF DESCRIPTION OF THE DRAWING

FIG. 1 is a schematic of a control system embodying the present invention; and

FIG. 2 is a modification of the schematic shown in FIG. 1.

DESCRIPTION OF THE PREFERRED EMBODIMENT

The control system of present invention includes a power source formed by a transformer including a high voltage primary coil 11 and a low voltage secondary coil 13. The secondary coil 13 is in circuit with a sensing bridge, generally designated 15, such circuit including a sensing thermistor 16, a heat motor 17 and a gas valve relay 19. When the temperature control system is utilized for controlling a heater (not shown) and the thermistor 16 is cooled sufficiently to unbalance the bridge 15, the gas valve relay 19 will be actuated and heating of the heat motor 17 commenced. At a selected time thereafter, a triggering thermistor 23 included in a control circuit, generally designated 25, will be heated sufficiently to unbalance such bridge and apply power to an electric blower fan 27 which blows air over the heater elements to provide forced heat conduction. Thus, the gas valve relay 19 will be actuated a predetermined time before the control bridge 25 is unbalanced thereby providing time for the heater to warm up before the fan 27 is actuated.

The bridge 15 includes a first leg made up of the upper half 31 of the secondary coil 13 and the heat motor 17. A second leg of the bridge 15 is formed by a calibration potentiometer 33 and a selector potentiometer 35 which may be utilized to select the desired temperature. The third leg of the bridge 15 is formed by the sensing thermistor 16 and the fourth leg is formed by a cooling heat motor 37 and the bottom half 39 of the secondary coil 13.

A switching means in the form of a silicon controlled rectifier (SCR) 41 has its anode and cathode connected in series between the node 43, intermediate the heat motor 17 and calibration potentiometer 33, and the center tap 44 of the secondary coil 13 by means of leads 45, 46, 47 and a feedback resistor 48. The lead 45 includes a current blocking diode 49 and is connected with the heating bar 51 of a rotary selector switch, generally designated 53. The selector switch 53 also includes an automatic cooling bar 56, a pair of off-bars 57 and 58, a second cooling bar 59. A rotary wiper 60, connected through the feedback resistor 48 and lead 46 to the anode of the SCR 41, is selectively engageable with the bars 51 and 57 for heating only, with bars 57 and 58 for deenergization, and with bars 58 and 59 for automatic cooling. The bridge node 61 between the cooling heat motor 37 and the sensing thermistor 16 is connected with the cooling bar 59 and with the automatic changeover bar 56 by means of a lead including a diode 62.

The gate of the SCR 41 is connected with the bridge node 63 between the selector potentiometer 35 and the sensing thermistor 16 by means of a lead 65.

The gas valve relay 19 is connected in parallel with the heating motor 17 and is, itself, connected in parallel with a free wheeling diode 71 by means of leads 73, 75, 79 and 81. The diode 71 blocks current flow through the leads 73 and 81 during positive going half cycles and enables current flow in the circuit comprised of leads 79, 81, 73 and 75 during negative going half cycles, to provide a path for current flow from the coil 19 during collapse of the magnetic field therein to provide hum-free operation and prevent voltage buildup in the coil 19. A resistor 82 (FIG. 2) may be substituted for the diode 71 to, likewise utilize the inductive current generated during collapse of the magnetic field in the coil 19 to prolong current flow during the negative going portion of the cycle. The resistor 82 may also replace the heat motor 17 to reduce the number of components.

A high limit switch 83 is connected in series with the relay 19.

The control circuit 25 comprises an SCR 89 which controls current flow from an a.c. line 91, through the fan 27, to the a.c. terminal 93 of a full wave rectifier bridge, generally designated 94. The remainder of the power portion of the circuit 25 is then from the a.c. terminal 95 of the rectifier bridge 94 to the other a.c. line 97 through lead 99.

The control circuit for the SCR 89 is formed by voltage divider means including the thermistor 23 which cooperate with a network comprised of a variable resistor 100 in parallel with a wave shaping network consisting of a capacitor 102 in series with a charge circuit consisting of diode 104 and resistor 103. This control circuit is connected between the anode and cathode of the SCR 89 and includes a tap 107 connected through lead 108 to the gate of such SCR.

In addition to the heating control heater 17, a remote control heater 115 and a compressor actuating heater 116 are provided in heat exchange relationship with the fan actuating thermistor 23 for independently actuating the fan 27. The remote control heater 115 is in series with a manual switch 121 for manually actuating such heater and the compressor-actuating heater 116 is in parallel with a compressor relay 122.

An air conditioning control circuit, generally designated 135, controls the cooling control heater 116 and the compressor relay 122. The control circuit 135 is similar to the fan control circuit 25 except it operates from 24 volts. The circuit 135 includes a rectifier bridge, generally designated 141, having one a.c. terminal 142 connected to one end of the secondary coil 13 and the other a.c. terminal 143 connected through the compressor relay 122 and cooling control heater 116, to the other end of the secondary transformer coil 13. The switching portion of the circuit 135 comprises an SCR 144 connected between the d.c. terminals 145 and 146 of the bridge 141. The SCR 144 is triggered by a signal from a voltage divider comprised of thermistor 147 and a resistor 149 as modified by a network including a capacitor 153, a diode 155 and a resistor 157 when the thermistor 137 is heated by cooling control heater 37. The gate of the SCR 144 is connected to a terminal 158 between the thermistor 147 and resistor 149.

In operation, the sensing thermistor 16 is mounted in the environment where the temperature is to be controlled and power is supplied to the primary coil 11. The wiper 60 of the control switch 53 will then be rotated to the selected position, as for instance, the position shown, for simultaneous contact of both the heat bar 51 and cooling bar 56. As long as the temperature of the environment stays within the range for which the selector potentiometer has been set, the temperature sensing bridge 15 will remain balanced and the SCR 41 untriggered. However, when the temperature of the environment falls below such temperature range, the resistance of the sensing thermistor 16 will be increased sufficiently to unbalance the sensing bridge 15 to provide a current at the node 63 which is sufficiently positive with respect to the current at the node 44 to trigger the SCR 41. Triggering of the SCR 41 initiates current flow through the circuit comprised of the gas valve relay 19, heating motor 17, lead 45, wiper 60, and leads 46 and 47. Energization of the relay 19 will open the gas valve (not shown) to start the heater (not shown). It is noted that current is blocked from passing from the cooling bar 59 of the switch 53 to the bottom of the secondary coil 13 by the diode 62.

Concurrent with actuation of the relay 19 the heat motor 17 will commence heating the triggering thermistor 23 of the control circuit 25 to, after a time delay, increase its resistance enough to change the voltage divider ratio to shift the gate voltage in such direction as to cause the SCR 89 to become conducting from the bridge rectifier 94 during both halves of the cycle, thus causing a.c. to flow on such a.c. side of the bridge to operate the fan 27.

The capacitor 102 between the anode and gate of the SCR 89 is charged at a rate determined by a resistor 103 and discharged at a rate determined by a diode 104 to form the triggering signal imposed on the gate to reach the triggering level early in the cycle and continue above the triggering level relatively late in the cycle. Initiation of current flow in the SCR 89 will complete the circuit through the fan 27 to commence blowing air through the heater (not shown). Thus, a certain delay time is provided after actuation of the gas valve relay 19 for the heater to warm up before the fan 27 is actuated, thus preventing the flowing of cold air.

When the environment becomes sufficiently heated to warm the sensing thermistor 16 and reduce its resistance to balance the bridge 15, the potential between the bridge node 63 and the center tap 44 of the secondary coil 13 will be reduced below the triggering level of the SCR 41, thus discontinuing anode-cathode current flow and causing the gas valve relay 19 to close its associated valve. Current flow will likewise be discontinued in the heat motor 17 to permit the triggering thermistor 23 to cool and return the control circuit 25 to its normal condition thereby discontinuing current flow through the fan 27.

When the environmental temperature is high enough to heat the sensing thermistor 16 and reduce its resistance sufficiently to unbalance the sensing bridge 15, the voltage drop between the bridge node 63 and center tap of the secondary coil 13 will exceed the triggering level for the SCR 41 and commence anode-cathode current flow therethrough. It is noted that the current blocking diode 49 prevents current flow from the bottom of the secondary coil 13, through the cooling heat motor 37, feedback resistor 48, wiper 60 and through the lead 45 but rather directs such current through the wiper 60, feedback resistor 48, into the anode of the SCR 41 and through the lead 47. Such current flow through the cooling heat motor 37 will cause it to heat the associated thermistor 147 to change the voltage in the circuit 135 and impose a triggering current on the gate of the SCR 144 to initiate anode-cathode current flow. The triggered SCR 144 will provide current flow through the compressor relay 122 to turn the compressor (not shown) on. It is important that the time lapse between energization of the cooling heat motor 37 and triggering of the SCR 144 provides sufficient time for the back pressure in the compressor to bleed off so that when the sensing circuit 15 cycles rapidly, as when the selector potentiometer 35 is turned to a warmer temperature and quickly back to a cold temperature, the compressor motor will not be starting against a relatively high compressor back pressure.

Triggering of the SCR 144 will also provide current flow through the fan heat motor 116 to initiate heating of the triggering thermistor 23 to again change the voltage in the circuit 25 and actuate the fan 27 at a selected time after the air conditioner has been actuated.

If at any time it is desirable to actuate the fan 27 without actuation of either the heater or air conditioner, the remote switch 121 may be closed to energize the heat motor 115 to heat the thermistor 23, thus changing the voltage in the circuit 25 and actuating the fan 27. This feature is of particular importance because the entire control circuitry can then be at a relatively low voltage, as for instance 24 volts, thereby avoiding the necessity of running expensive, heavy insulation wire from the furnace area to the remotely located control area. Further, the operator is always protected from the high voltage of the fan control circuit 25.

It will be clear that the wiper blade 60 of the selector switch 53 may be rotated to energize either the heating system or cooling system independently or to turn both systems off.

From the foregoing description, it will be apparent that the temperature control system of present invention provides an economical means for delaying actuation of an air conduction fan until after the associated heating or cooling apparatus has had an opportunity to reach its steady state condition. Also, the sensing circuits and control circuits are electrically isolated from one another to provide for economic and convenient installation and safety for the operator. Further, the described result is accomplished without the necessity of movable contacts which are subject to arcing and electrical welding.

While particular forms of the temperature control circuit and systems have been described in some detail herein, changes and modifications may occur to those skilled in the art without departing from the spirit of the invention. It is therefore intended that the present invention be limited in scope only by the terms of the following claims.

I claim:

1. A heat coupled control system for maintaining an environment in a selected temperature range, said system comprising:
   an environmental temperature sensing circuit including a temperature sensing circuit including a temperature sensing element for being disposed in said environment and first electrical resistance means, said circuit being responsive to said environmental temperature falling outside said range to produce changes in current flow in said first electrical resistance means to effect a predetermined temperature change therein; and
   a fluid circulation apparatus control circuit operative to actuate fluid circulation apparatus and including a temperature sensitive resistor means disposed in heat exchange relationship with said first electrical resistance means, said temperature sensitive resistor being responsive to said predetermined temperature change to alter its resistance and effect a corresponding current change in said control circuit to operate said fluid circulation apparatus whereby said temperature sensing circuit and circulation apparatus control circuit are electrically isolated from one another.

2. A heat coupled control system as set forth in claim 1 for controlling a temperature change apparatus and wherein said temperature sensing circuit includes a control device adapted for coupling to the temperature change apparatus and responsive to changes in current flow to, in a relatively short period of time, actuate said temperature change apparatus, the period of time required to produce the temperature change in said temperature sensitive resistor by said first electrical resistance means being longer than said relatively short period to cause said circulation apparatus to be actuated a selected time after said temperature change apparatus to enable said temperature change apparatus to reach a desired temperature before said circulation apparatus is actuated.

3. A heat coupled control system as set forth in claim 1 wherein said first electrical resistance means and said temperature sensitive resistor are electrically insulated from one another.

4. A heat coupled control system as set forth in claim 1 that includes a second electrical resistance means disposed in heat exchange relationship with said temperature sensitive resistor, and a switch in series with said second electrical resistance means for connection with a power source whereby closure of said switch will effect heating of said second electrical resistance means and actuate said fluid circulation apparatus independently of current flow in said first electrical resistance means.

5. A heat coupled control system as set forth in claim 1 for controlling a heater and an air conditioner and wherein:
  said sensing circuit includes a second electrical heat resistance means;
  said control circuit includes a heater control device responsive to said current changes in said control circuit to actuate said heater; and
  wherein said system includes a second control circuit including an air conditioner control element responsive to current changes to actuate said air conditioner, second temperature sensitive resistor means disposed in heat exchange relationship with said second electrical resistance means and responsive to temperature changes to alter current flow in said second control circuit and operate said air conditioner control element.

6. A heat coupled control system as set forth in claim 5 wherein said sensing circuit includes a bridge having said temperature sensing element in one leg thereof, a silicon controlled rectifier having a first electrode thereof connected with first and second nodes, respectively, of said bridge by first and second leads; first and second unidirectional current directing elements in circuit with said first and second leads, respectively; said first and second electrical resistance means being connected with said first and second nodes, respectively, said rectifier having its gate and a second electrode thereof connected to third and fourth nodes of said bridge, whereby said system will automatically actuate said heater when the environmental temperature falls below a specified lower limit and will actuate said air conditioner when said environmental temperature rises above a specified upper limit.

7. A heat coupled control system as set forth in claim 1 for controlling a temperature change apparatus and that includes:
  an electromagnetic operator for operating said temperature change apparatus; and
  blocking means connected in parallel with said operator means for resisting flow of current during positive going portions of current cycle to direct current through said operator means and providing a current path during negative going portions of current cycle to provide a path for current induced by the decay of the magnetic field in said operator.

8. A heat couple control system as set forth in claim 7 wherein said blocking means is in the form of a resistor.

9. A heat coupled control system for operating a temperature change apparatus to maintain an environment in a selected temperature range, said system comprising:
  an environmental temperature sensing circuit including a temperature sensing element for being disposed in said environment and electrical resistance means, said circuit being responsive to said environmental temperature falling outside said range to produce changes in current flow in said electrical resistance means to effect a predetermined temperature change therein; and
  a temperature change apparatus control circuit operative to actuate said temperature change apparatus and including a temperature sensitive resistor means disposed in heat exchange relationship with said electrical resistance means, said temperature sensitive resistor being responsive to said predetermined temperature change to alter its resistance and effect a corresponding current change in said control circuit to operate said temperature change apparatus whereby said temperature sensing circuit and said temperature change apparatus control circuit are electrically isolated from one another and the time lapse required to heat said electrical resistance sufficiently to provide said predetermined temperature change providing a time delay between the time said temperature sensing circuit responds to said environment temperature falling outside said range and the time said temperature control apparatus is actuated.

10. A heat coupled control system as set forth in claim 9 adapted for operating a temperature change apparatus that includes a temperature change element and wherein said system includes:
  an operator connected with said sensing circuit for operating said temperature change apparatus, said operator being responsive to said changes in current flow to actuate said temperature change element; and
  fluid circulation means for circulating fluid in heat exchange relationship with said temperature change element and connected with said control circuit and responsive to said current changes therein to initiate circulation of fluid over said temperature change element.